US012285963B2

(12) United States Patent
Clement

(10) Patent No.: US 12,285,963 B2
(45) Date of Patent: Apr. 29, 2025

(54) METHOD FOR MANUFACTURING A PANEL

(71) Applicant: Unilin, BV, Wielsbeke (BE)

(72) Inventor: Benjamin Clement, Waregem (BE)

(73) Assignee: Unilin, BV, Wielsbeke (BE)

( * ) Notice: Subject to any disclaimer, the term of this patent is extended or adjusted under 35 U.S.C. 154(b) by 54 days.

(21) Appl. No.: 18/247,211

(22) PCT Filed: Sep. 14, 2021

(86) PCT No.: PCT/IB2021/058335
§ 371 (c)(1),
(2) Date: Mar. 29, 2023

(87) PCT Pub. No.: WO2022/069982
PCT Pub. Date: Apr. 7, 2022

(65) Prior Publication Data

US 2023/0364938 A1 Nov. 16, 2023

(30) Foreign Application Priority Data

Oct. 1, 2020 (EP) .................................... 20199647

(51) Int. Cl.
*B41M 5/50* (2006.01)
*B41M 5/52* (2006.01)
*B41M 7/00* (2006.01)

(52) U.S. Cl.
CPC ............ *B41M 5/5218* (2013.01); *B41M 5/52* (2013.01); *B41M 5/5254* (2013.01); *B41M 7/009* (2013.01); *B41M 5/5281* (2013.01)

(58) Field of Classification Search
CPC .... B41M 5/5218; B41M 5/52; B41M 5/5254; B41M 7/009; B41M 5/5281
(Continued)

(56) References Cited

U.S. PATENT DOCUMENTS

2005/0175818 A1* 8/2005 Kawabata ............. B32B 27/308 428/195.1
2013/0286088 A1* 10/2013 Ryberg ..................... B44F 9/02 347/21
(Continued)

FOREIGN PATENT DOCUMENTS

EP 1044822 B1 9/2004
EP 1749676 B1 2/2007
(Continued)

*Primary Examiner* — Betelhem Shewareged
(74) *Attorney, Agent, or Firm* — Capitol City TechLaw

(57) ABSTRACT

A method may be provided for manufacturing a panel of the type having a support and a top layer. The top layer may have a printed motif and a wear layer disposed above the motif. The wear layer may be fabricated from PVC. The top layer may include an inkjet receiving layer that has less than 10% by weight of water absorbing substances. The method may involve providing a printing substrate, providing the printing substrate with the inkjet receiving layer, and digitally inkjet printing the motif with a set of water based inks. The digital inkjet printing may involve one or more printing operations. Each of the printing operations may be dedicated to print one color. The method may involve one or more ink drying steps. Each of the drying steps may be performed after performing one or more respective printing operations.

17 Claims, 2 Drawing Sheets

(58) Field of Classification Search
USPC .......................................................... 428/32.3
See application file for complete search history.

(56) References Cited

U.S. PATENT DOCUMENTS

| | | | | |
|---|---|---|---|---|
| 2014/0144583 | A1 | 5/2014 | Hakansson et al. | |
| 2020/0299531 | A1 * | 9/2020 | Nakamura ........... | C09D 11/324 |
| 2023/0364938 | A1 * | 11/2023 | Clement .................. | B41M 5/52 |

FOREIGN PATENT DOCUMENTS

| | | | |
|---|---|---|---|
| EP | 1857511 | B1 | 11/2007 |
| EP | 1872959 | B1 | 1/2008 |
| EP | 2274485 | B1 | 1/2011 |
| EP | 2293946 | B1 | 3/2011 |
| EP | 2431190 | B1 | 3/2012 |
| WO | 2011124503 | A2 | 10/2011 |
| WO | 2014084787 | A1 | 6/2014 |
| WO | 2015118451 | A1 | 8/2015 |
| WO | 2015140682 | A1 | 9/2015 |

* cited by examiner

METHOD FOR MANUFACTURING A PANEL

This application claims priority under 35 USC § 119(a)-(d) to EP patent application No. 20199647.7, which was filed on Oct. 1, 2020, the entire content of which is incorporated herein by reference.

BACKGROUND

1. Field

The present invention relates to a method for manufacturing panels having a decorative surface, so-called decorative panels. The invention also relates to a method for manufacturing foil printable with inkjet for use as a decor foil in such panels and to the foil obtainable with such method. According to a variant the obtained decor foil may be used in a laminated assembly other than a panel, such as in room-wide heterogenous vinyl flooring.

More particularly the invention is related to a method for manufacturing panels, especially made of thermoplastic material, wherein said panels at least comprise a substrate material and a provided thereon top layer with a printed motif. The method of the invention could be used for manufacturing panel the top layer of which is formed from thermoplastic material, such as PVC, including at least one thermoplastic decor foil having a printed motif. The panels of the invention may relate to furniture panels, ceiling panels, flooring panels or similar, wherein these panels preferably comprise a substrate. According to the preferred embodiment, the panels comprise a filled synthetic composite material substrate or a mineral based substrate or cement based. These latter panels are also referred to as LVT panels (Luxury Vinyl Tiles), SPC panels (Solid Polymer Composite), WPC (Wood Polymer Composite).

2. Related Art

Traditionally, the decor or pattern of such panels is printed on thermoplastic foil by means of offset or rotogravure printing. The obtained foil is taken up as a decor foil in a so-called LVT panel. For manufacturing the panels, preferably at least a lamination of the decor foil and a transparent thermoplastic wear layer is carried out in order to form the top layer of the panel. The mutual connection or adherence of the decor foil and the transparent wear layer is preferably obtained through a thermal lamination process, e.g. by using one or more heated press rollers. The obtained top layer may then be glued or thermally laminated to the substrate. In order to possibly form a relief in the top layer a press treatment or pressing operation may be used. Namely by bringing the thermoplastic top layer in contact with a structured press element, for example a structured press roller. The press element is preferably cooled, while the thermoplastic top layer is presented to the roller in a heated condition, such that the thermoplastic top layer may be cooled down and frozen while in contact with the press element, thereby taking over the negative of the structure of the press element.

The printing of thermoplastic foil by means of an analog printing process, such as by rotogravure or offset printing, at affordable prices inevitably leads to large minimal order quantities of a particular decorative foil and restricts the attainable flexibility. A change of decor or pattern necessitates a standstill of the printing equipment of about 24 hours. This standstill time is needed for exchange of the printing rollers, the cleaning of the printing equipment and for adjusting the colors of the new decor or pattern to be printed.

Instead of analog printing techniques, digital printing techniques, especially inkjet printing techniques, are becoming increasingly popular for the creation of decors or patterns, be it on paper, on foil or directly on a plate-shaped substrate possibly with the intermediary of preparatory layers. Such digital techniques can enhance the flexibility in the printing of decors significantly. Reference is amongst others made to the EP 1 872 959, WO 2011/124503, EP 1 857 511, EP 2 431 190, EP 2 293 946, WO 2014/084787, WO 2015/140682 and the WO 2015/118451, where such techniques are disclosed.

EP 1 044 822, EP 1 749 676 and EP 2 274 485 disclose the use of an inkjet receiver coating to enhance the printing quality on a raw decor paper. Such inkjet receiver coating comprises (water) absorbing particle, especially silica, and a binder, usually a crosslinked polymer such as polyvinyl alcohol (PVA).

If on one hand the absorbing particles can improve the quality of the print, they can stiffen the foil thereby interfering with the embossing of a structure in the top layer of the panel. Moreover, since the water absorbing particles have bad affinity with thermoplastic material used for the foil and for the wear layer, in particular PVC, and are inert during lamination, they can cause adhesion issues during the lamination process between the foil and the wear layer. Furthermore, the presence of water absorbing particles in the coating might cause delamination when the panel, in use, is cleaned with water since water can be attracted by the particles.

For the thermal lamination process to be effective it is important to guarantee good adhesion between the different thermoplastic layers. Such adhesion can be affected by the kind of inks, for example UV ink can have bad adhesion to PVC, and by the presence of liquid, for example water between the layers. WO 2015/140682 proposes to improve the adhesion between the layer by adding an adhesion promoting layer between the thermoplastic layers.

SUMMARY

The present invention aims in the first place at an alternative method for manufacturing panels having a decorative surface or thermoplastic foil, for use in such panels, and seeks, in accordance with several of its preferred embodiments, to solve one or more of the problems arising in the state of the art.

Therefore, the present invention, in accordance with its first independent aspect, relates to a method for manufacturing thermoplastic foil printable with an inkjet printer for use as a decor foil, in a laminate panel, wherein the method at least comprises the following steps:

- the step of providing a thermoplastic foil;
- the step of coating at least one side of said foil, with an inkjet receiver coating; with as a characteristic that said inkjet receiving coating comprises a content of water absorbing substance below 10% wt. Said water absorbing substance can comprise pigments, in particular minerals, like silicate or aluminum silicates, for example talc, clays, calcined clays, kaolin, silica. In the preferred embodiment, the inkjet receiving layer comprises a water-absorbing particle content below 5%, preferably below 1%, more preferably is free from water-absorbing particles. By reducing the quantity of water absorbing substance the foil becomes more flexible so that it can be rolled again after printing without deteriorating the print and it is also possible to improve embossing of the structure on the top surface panel. On the other hand the inkjet receiving layer allow to improve the print quality on the foil. Within the context of the present application with water absorbing particle or substance is meant a substance, in particular in form of particle that is able to absorb liquid in particular the vehicle of the ink. Thus, the invention is not limited to water absorbing particle but is meant to encompass liquid absorbing substances.

Preferably, the inkjet receiver layer comprises polymeric substance, also called binder, preferably a thermosetting substance.

In the preferred embodiment, the binder can comprise water-based dispersion of terpolymer vinyl chloride, vinyl acetate ethylene; water-based dispersion or copolymer vinyl chloride, vinyl acetate; water-based aliphatic PU dispersion; other non-blocking water-based acrylics dispersions or a water-based styrene acrylic dispersion or combinations thereof.

In an embodiment, as polymeric substance in said inkjet receiver coating at least or mainly polyvinyl alcohols are used.

According to variants, the inkjet receiver coating includes, a polymer selected from the group consisting of hydroxyethyl cellulose; hydroxypropyl cellulose; hydroxyethylmethyl cellulose; hydroxypropyl methyl cellulose; hydroxybutylmethyl cellulose; methyl cellulose; sodium carboxymethyl cellulose; sodium carboxymethylhydroxethyl cellulose; water soluble ethylhydroxyethyl cellulose; cellulose sulfate; vinylalcohol copolymers; polyvinyl acetate; polyvinyl acetal; polyvinyl pyrrolidone; polyacrylamide; acrylamide/acrylic acid copolymer; polystyrene, styrene copolymers; acrylic or methacrylic polymers; styrene/acrylic copolymers; ethylene-vinylacetate copolymer; vinylmethyl ether/maleic acid copolymer; poly(2-acrylamido-2-methyl propane sulfonic acid); poly(diethylene triamine-co-adipic acid); polyvinyl pyridine; polyvinyl imidazole; polyethylene imine epichlorohydrin modified; polyethylene imine ethoxylated; ether bond-containing polymers such as polyethylene oxide (PEO), polypropylene oxide (PPO), polyethylene glycol (PEG) and polyvinyl ether (PVE); polyurethane; melamine resins; gelatin; carrageenan; dextran; gum arabic; casein; pectin; albumin; chitins; chitosans; starch; collagen derivatives; collodion and agar-agar. The most preferred variants for the binder are polyvinyl acetates, ethylvinylacetates, block copolymers based on polyvinylacetate, block copolymers based on polyvinylalcohol, acrylates, latexes, polyvinyl derivaties, VCVAC derivatives, polyurethanes based on polyols and isocyanates, polyurethanes based on polycarbamates and polyaldehydes, e.g. both as a waterbaseddispersion/emulsion or a waterbased or solvent solution.

It is to be noted that, the ink receiver coating can comprise also a crosslinking agent for the crosslinking reaction of the polymeric substance itself. In case of presence of a crosslinking agent this is preferably selected from the group comprising: aldehydes, polyaldehydes, dialdehydes, alcohols, boronic acid, borax, polyalcohols, carbamates, polycarbamates, carbonic acids, glyoxal based agent, zirconium-based agents, titanates and polycarbonic acids.

The inkjet receiver coating can further comprise a dispersant. A dispersant is an oligomer or polymer which stabilize the liquid dispersions of pigment against flocculation. The dispersant can comprise polycarboxylates, polyphosphates, a polyionic polymer, preferably polyDADMAC (Polydiallyldimethylammonium chloride) polyamine or alumina salts.

Preferably, the inkjet receiver coating is provided with less than 10%, more preferably less than 5% based on dry coating weight of dispersant, for example between 5 and 0.1%.

The inkjet receiver coating can also comprise a flocculant, preferably a metal salt, preferably a cationic metal salt. Preferably said metal salt is chosen from the list consisting of $CaCl_2$, $MgCl_2$, $CaBr_2$, $MgBr_2$, CMA (Calcium Magnesium Acetate), $NH_4Cl$, Calcium Acetate, $ZrCl_4$, calcium nitrate and Magnesium Acetate. The positive ion of the dissolved metal salt will tend to neutralize the electrosteric stabilization function of the pigment. The most preferred cationic metal salts are $CaCl_2$, $MgCl_2$, CMA, Calcium Acetate, calcium nitrate and Magnesium Acetate, as the inventors have obtained the best results with these ink reactive compounds. Said flocculant can also be chosen from the list consisting of sodiumaluminate, a double sulphate salt such as alum, polyaluminumchloride, polyacrylate, dicyandiamide (e.g. Floquat DIS from SNF) and polyacrylamide. The flocculating agent pulls the ink pigments out of the ink dispersion. Thereby the pigments are prevented from penetration to far down into the ink receiver coating. Mainly the vehicle of the ink, e.g. the water in the case of waterbased inks, is absorbed deeper down into the ink receiver coating.

Preferably, inkjet receiver coating is provided with 20 to 60%, based on dry coating weight of flocculating agent, in particular of metal salt.

In a particular embodiment the inkjet receiving coating can be acidic. In particular can comprise one or more acid component. Said acid component can be either organic or inorganic. Preferred examples of acid component are citric acid, formic acid, lactic acid, propionic acid or a combination thereof. Preferably said acid component can show a pH 5, more preferably below 4.5. Said acid component has the function of destabilizing the ink dispersion and is generally used as an alternative to the above mentioned metal salts.

The inkjet receiver coating may also comprise one or more of the following agents:

- Agents altering, more particularly lowering, the pH of said inkjet receiver coating. Preferably the pH of the inkjet receiver coating composition is lowered to pH 5 or lower, by selecting the amount and type of said substance, which selection is within the ambit of the skilled man. Preferably said substance is chosen from the list consisting of formic acid, tartaric acid, acetic acid, hydrochloric acid, citric acid, phosphoric acid, sulfuric acid, $AlCl_3$ and boronic acid. An adjusted, more particularly lowered pH, preferably to pH 5 or less, increases the chemical affinity of the inkjet receiver coating with the ink and will interfere with the electrosteric stabilization function on the pigment, such that the dispersion of the pigments in the ink will become destabilized quickly.
- Particle surface modifying agents or coupling agents: between 0.05 and 5 g/m$^2$, preferably between 0.2 and 2 g/m$^2$, e.g. chosen from the non-limiting list consisting of amino silanes, ureido silanes, aldehyde silanes, tetraethylorthosilicate, siliazanes, organically modified silanes, organically modified siliazanes, chlorosilanes, organically modified chlorosilanes, bissilanes, organobissilanes, silsesquioxanes, polysilsesquioxnes, silane oligomers, organically modified silane oligomers, bissilane oligomers, organically modified bissilane oligomers, oligomeric silsesquioxanes, and oligomeric polysilsesquioxanes.

Additives: wetting agent between 0.005 and 2 g/$m^2$, preferably between 0.05 and 1 g/$m^2$; and/or defoaming agent between 0.005 and 2 g/$m^2$, preferably between 0.05 and 1 g/$m^2$; and/or fungicide between 0.005 and 2 g/$m^2$, preferably between 0.05 and 1 g/$m^2$.

Preferably, said foil is provided with 0.2 to 10 g/$m^2$, and preferably between 0.5 and 5 g/$m^2$, dry weight of said inkjet receiver coating.

Preferably the thermoplastic foil onto which the inkjet receiver coating is applied has a base weight of 50 to 100 grams per square meter, e.g. between 60 and 80 grams per square meter.

The thermoplastic foil can be of any material, such as polyvinylchloride (PVC) foil, polypropylene (PP) foil, polyethylene (PE) foil, polyethylene-terephthalate (PET) foil or thermoplastic polyurethane (TPU). The preferred thermoplastic material is PVC, and the preferred binder for use on such thermoplastic foils is polyurethane based, acrylate based, or polyvinyl acetate based.

Preferably, in the method of the invention, the foil is intended to be printed using water-based inks or UV curing inks or hydro-UV inks, in particular comprising pigmented inks. Water-based ink are a preferred choice because thanks to their flexibility they allow to improve embossment on the panel, moreover they represent a sustainable and ecological choice for the ink. It is also to be noted that by using water-based inks it is possible to reduce the risk of damaging the print heads thanks to the absence, or low quantity, of polymeric substances that can dry and clog the printhead.

The ink can comprise a binding agent. Preferred examples of binding agent are VC-VAC copolymer or polymer latexes, either acrylates or urethane dispersion or combinations thereof components. Preferably, the inks show an amount of binding agent which is as high as possible, such that an optimum subsequent lamination with the wear layer can be obtained with an acceptable jet behavior. An amount of binder or binding agent of at least 2, at least 8 or even at least 10 percent by weight of the liquid ink seems viable. Due to the jet behavior, the amount of binding agent preferably should be kept lower than 20 percent by weight. Preferably the binder can have a MFFT (Minimum Film Forming Temperature) below 60° C., more preferably below 50° C., for example 40° C. or less. Such a low value of MFFT provides for an easily dryable ink so that the ink itself can be effectively fixed onto the ink receiving layer, even in absence of absorbing substances, and without excessively heating the foil.

According to the most preferred embodiment said inkjet receiver coating is applied in one step in order to form a unique layer having the inkjet receiving coating composition. Anyway, it is not excluded that said inkjet receiver coating is applied in at least two partial steps, wherein respectively a first layer with a first composition and, subsequently, a second layer is applied with a second composition wherein said first and second composition may be either the same or different compositions.

Generally, it is noted that, although the foil obtained with the method of the invention is printable with an inkjet printer, it is not excluded that the foil eventually is printed using other techniques, such as rotogravure or offset printing. Also, in such case, the diminished dust release and the potentially better printing quality is of interest. This is especially the case when aqueous inks are being used.

Preferably, said inkjet receiving coating is a liquid substance which is deposited on said foil. Preferably the liquid substance is a water-based suspension of at least said binder.

The deposition of said liquid substance of the inkjet receiver coating can be obtained in any way, possibly by means of printing, e.g. inkjet printing, but preferably by means of coating techniques, such as roller coating, e.g. by means of one or more gravure rollers, spraying, metering rollers, bead coating, scattering, slot die coating. With the latter techniques, preferably a coating is obtained that covers at least 80% of the surface of the foil Inline measurement systems may be desirable to steer and control the weight of the inkjet receiver coating. Such technique brings down the risk of obtaining uncoated areas of the foil, which could lead to local flaws in the printed motif. A preferred equipment for application of the liquid substance is a rotogravure or anilox coating device.

The deposition of the liquid substance for the ink receiving coating may be performed in a rotogravure coating line or, alternatively, on the printing equipment, immediately before the printing operation. This last case solves any possible issues with limited shelf life of the inkjet receiver coating. Preferably the deposition of the liquid substance is performed while the foil is still in an “endless” shape, namely taken from the roll without cutting. Such techniques allow for a more uniform application of the inkjet receiver coating. In the case the coating is wholly or partially done on the printing equipment, the printing equipment is preferably a roll-to-roll or a roll-to-sheet printer, comprising a coating device upstream of the print heads, for example a gravure coater and/or additional printing heads suitable for printing the liquid substance for the respective sublayer of the inkjet receiver coating. Such additional printing heads, for example an additional row of printing heads, may have nozzles with a larger diameter than those used for the actual printing of the pattern. A resolution of 1 to 100, or even 1 to 25 dots per inch may suffice for these nozzles.

After printing, the ink can be dried to remove water or vehicle residues thereby improving the thermal lamination on the panel. In the preferred embodiment of the invention, it is possible to perform multiple drying steps to dry one or more inks. For example, in case of printing a set of inks, preferably a set of colored inks, it is possible to perform a drying step dedicated do each color. It may also be possible to perform one drying step after a printing a group of color, for example performing one drying step between printing two groups of colors. More in detail it is possible that after each printing head or printing unit a drying unit is provided, for example a drying NIR (Near Infra-Red) pin, to perform one drying step between the printing units. It is also possible that, during printing, the foil is placed on a heated support, for example a heated printing drum. More in general the printing step can comprise one or more printing operations wherein each of said printing operations is dedicated to print one color and wherein the method comprises one or more ink drying step, wherein said drying step is performed after performing one or more respective printing operations. According to another possibility it is possible that the printing operation is performed at a temperature different, preferably higher, to environment temperature, for example said printing operation is performed at a temperature below 100° C., for example below 60° C.

In order to improve the lamination between the printed foil and the upper wear layer, it is possible to provide a first adhesion layer on top of the printed foil. Preferably, the adhesion layer comprises, or is formed by, the same substance forming the binder of the ink receiving layer. Preferably the adhesion layer can comprise water-based dispersion of terpolymer vinyl chloride, vinyl acetate ethylene; water-based dispersion or copolymer vinyl chloride, vinyl acetate; water-based aliphatic PU dispersion; other non-blocking water-based acrylics dispersions or a water-based styrene acrylic dispersion or combinations thereof. Component of the adhesion layer can be self-cross linkable or the adhesion layer can comprise a crosslinker. The adhesion layer can comprise additives like wetting agent, biocide, leveling agent, antifoam, solvent, coloring agent like pigment.

According to an embodiment of the invention, a second adhesion layer can be provided below the printed foil, i.e between the printed foil and the substrate. This is particularly the case when the substrate is not made of a thermoplastic material or when the substrate is made of a thermoplastic material that is different than that forming the foil. The second adhesion layer can be formed by the same substances forming the first adhesion layer although, according to the specification of the materials, can be formed by different substances.

The wear layer preferably comprises a transparent or translucent sheet made of a thermoplastic material, preferably PVC. The wear layer can comprise hard particles to improve abrasion resistance, for example aluminum oxide particles.

In order to avoid early drying of the ink at the printheads of the printer, it is preferable that the printer is equipped with an ink recirculating system. Preferably the ink recirculating system comprises a recirculating capacity above 3 ml/min, more preferably above 5 ml/min, for example of 10 ml/min or more. In this way it is possible to reduce risk of damaging the print heads even in case of use of ink with low MFFT, and in case of printing at high temperature.

It is clear that the present invention also relates to thermoplastic foils that are obtained using the methods of the first aspect of the present invention. With the same aim as in said first aspect, according to a second independent aspect, the invention also relates to a thermoplastic foil for inkjet printing, wherein said foil at least at one side is provided with an inkjet receiver coating having an absorbing substance content below 10% wt. Preferably said inkjet receiver coating is free from any water absorbing substance.

It is to be noted that said foil can comprise one or more of the features described above in relation to the first independent aspect.

The invention further, in accordance with its third independent aspect, relates to a method for manufacturing a panel, wherein said panel at least comprises a substrate material and a provided thereon top layer with a printed motif, wherein said top layer is substantially formed from one or more thermoplastic foils, wherein said foils comprise a decor foil on the basis of a fil for inkjet printing in accordance with the second independent aspect and/or obtained by means of a method in accordance with the first independent aspect and/or the preferred embodiments of these aspects.

Preferably, in said third aspect, the foil for inkjet printing is printed by means of an inkjet printer and is attached to said substrate material by means of a hot-pressing treatment. Preferably, said inkjet printer operates on the basis of water-based inks, wherein, more particularly, an inkjet printer of the single-pass type and/or an inkjet printer operated in single-pass mode is preferred.

Clearly, the foil having the inkjet receiving layer of the invention may be used in a method for manufacturing panels having a decorative surface, wherein said panels at least comprise a substrate and a top layer, wherein said top layer comprises a foil having a printed motif, with as a characteristic that for providing said portion of said printed motif use is made of pigment containing inks deposited on said paper layer by means of a digital inkjet printer, and in that said ink is a water based ink and said ink comprises a binder. Preferably said binder comprises binding agent are VC-VAC copolymer or polymer latexes, either acrylates or urethane components dispersion or combinations thereof. Preferably said binder shows a MFFT below 60° C., more preferably below 50° C., for example 40° C. or less.

Preferably the step of printing is performed at a temperature above external environment temperature, for example below 100° C., preferably below 60° C. After printing, the ink can be dried to remove water or vehicle residues thereby improving the thermal lamination on the panel. In the preferred embodiment of the invention, it is possible to perform multiple drying steps to dry one or more inks. For example, in case of printing a set of inks, preferably a set of colored inks, it is possible to perform a drying step dedicated do each color. More in detail it is possible that after each printing head or printing unit a drying unit is provided, for example a drying NIR (Near Infra-Red) pin, to perform one drying step between the printing units. It is also possible that, during printing, the foil is placed on a heated support, for example a heated printing drum.

Preferably, the printed foil is provided with an adhesion layer as described in relation to the first independent aspect.

As is clear from the above, the method of the third aspect of the invention preferably comprises the step of thermal laminating the printed foil, on top of the substrate.

Preferably a wear layer is applied above the printed motif after printing, e.g. by way of a plastic thermoplastic foil or a liquid coating, preferably while the printed foil is laying on the substrate, either loosely or already connected or adhered thereto.

The method can also comprise a step of embossing the upper surface of the panel, for example by embossing the wear layer and/or the printed foil. The embossing step can be before, after or during thermal lamination of the thermoplastic foils on the substrate. It is also possible that the wear layer is provided with an embossed structure.

The foil of the invention may be a colored, pigmented and/or dyed base foil. The use of a colored and/or dyed base layer enables further limiting the dry weight of deposited ink for attaining a particular pattern or color, so that that flexibility of printed foil is improved. According to an alternative embodiment the ink receiving layer on said foil to be printed is colored or pigmented with colored pigments.

It is further clear that the thermoplastic foil obtained in the first aspect of the invention is suitable for use as a decor foil, in a method for manufacturing floor panels, furniture panels, ceiling panels and/or wall panels.

According to the fourth independent aspect of the invention the printing operation can be performed directly on the panel. Within the scope of the present invention, with "printed directly" it is meant that the printing operation is performed on the support, that in this case act as a printing substrate, instead of being performed on a separate printing substrate, for example a foil. Thus, the expression "printed directly" doesn't exclude that on top of the substrate can be provided one or more layer before printing like, for example, the ink receiving layer. According to a deviant embodiment it is also possible that a blank foil is attached on top of the support and then printed so that the printed motif is printed directly on the support. Therefore, according to its fourth independent aspect, the invention relates to a method for manufacturing a panel comprising the steps of: providing a substrate, preferably made of a thermoplastic material, providing an ink receiving layer on top the substrate, printing a decor directly on top of the substrate, preferably with an inkjet printing. With the characteristic that the inkjet receiving layer has an absorbing particles content below 10% wt, preferably free from absorbing particles. The method according to the fourth independent aspect can comprise one or more feature described in relation to the other independent aspects.

In a preferred embodiment of the fourth independent aspect, the inkjet receiving layer is disposed in direct contact with the surface of the substrate so that the panel is substantially free from the foil.

BRIEF DESCRIPTION OF THE DRAWINGS

With the intention of better showing the characteristics according to the invention, in the following, as an example without limitative character, an embodiment is described, with reference to the accompanying drawings, wherein.

DESCRIPTION OF NON-LIMITING EMBODIMENTS

Figure 1:
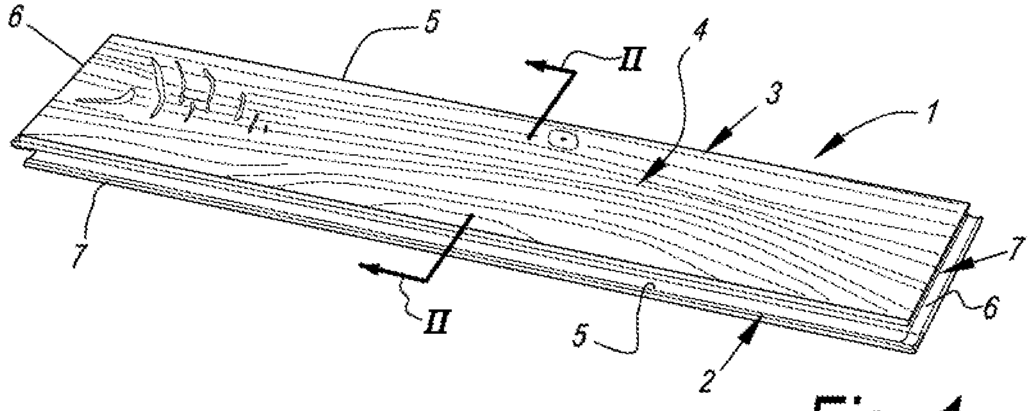
FIG. 1 shows in perspective a panel according to the invention.
Figure 2:
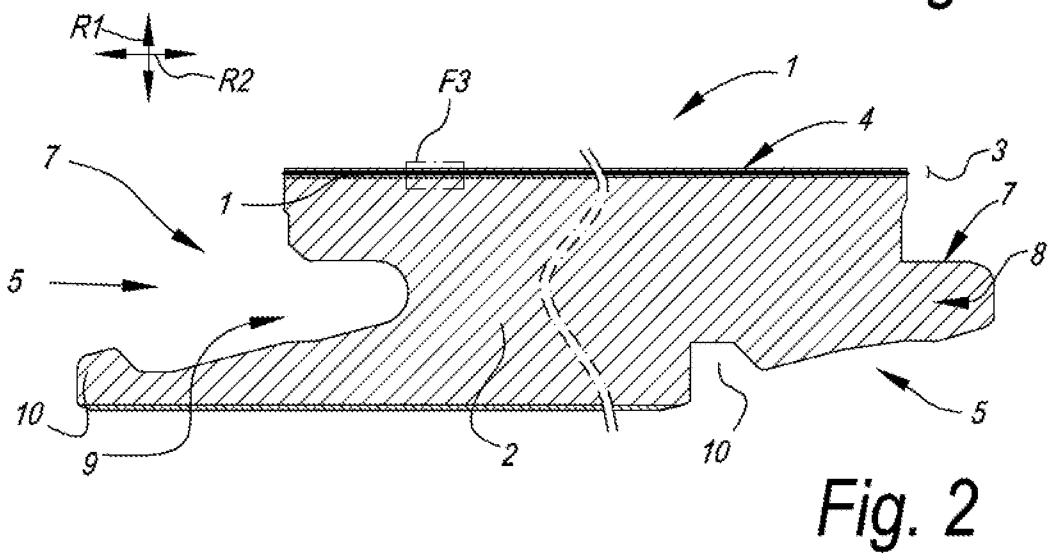
FIG. 2 shows a view according to the line II-II indicated on FIG. 1.

FIG. 1 illustrates a decorative panel 1 comprising a substrate 2 made of a thermoplastic material, preferably rigid PVC in the form of the so called SPC and a top layer 3 provided with a printed motif 4, in this case imitating a wood decor. The panel 1 can have the shape of a rectangular and oblong floor panel, with a pair of long sides 5 and a pair of short sides 6. In this case the panel 1 is provided at least at the long sides 5 with coupling means 7 allowing to lock the respective sides 5 together with the sides of a similar panel both in a direction R1 perpendicular to the plane of the coupled panels, as in a direction R2 perpendicular to the coupled sides and in the plane of the coupled panels. As illustrated in FIG. 2 such coupling means or coupling parts can basically have the shape of a tongue 8 and a groove 9, provided with additional cooperating locking means 10 allowing for said locking in the direction R2.

Figure 3:
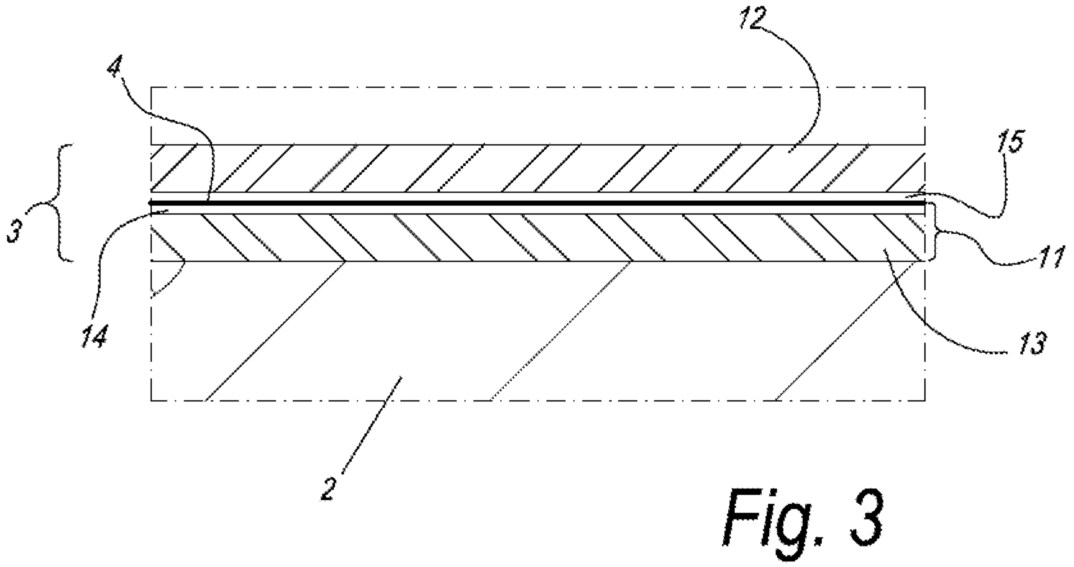
FIG. 3 on a larger scale provide a view on the area F3 illustrated in FIG. 1.

FIG. 2 and FIG. 3 show that the top layer 3 comprises a decorative foil 11 and a wear layer 12 provided on top of the decorative foil 11. The decorative foil 11 comprises a thermoplastic foil 13 for example made of PVC, and the digitally printed decor 4. The decorative foil 11 further comprises an inkjet receiving layer 14. In the example the inkjet receiving layer comprises a binder and is free from any water absorbing substance. The binder preferably comprises water-based dispersion of terpolymer vinyl chloride, vinyl acetate ethylene; water-based dispersion or copolymer vinyl chloride, vinyl acetate; water-based aliphatic PU dispersion; other non-blocking water-based acrylics dispersions. The inkjet receiving layer further comprise a cross linker, a metal salt and other additives like dispersant, coupling agent, wetting agent or PH modifiers.

In the example, the wear layer 12 is a transparent thermoplastic foil, preferably made of PVC.

Between the decorative foil 11 and the wear layer 12 is provided an adhesion layer 15 comprising water-based dispersion of terpolymer vinyl chloride, vinyl acetate ethylene; water-based dispersion or copolymer vinyl chloride, vinyl acetate; water-based aliphatic PU dispersion; other non-blocking water-based acrylics dispersions, thereby strongly improving lamination between the decorative foil and the wear layer.

Figure 4:
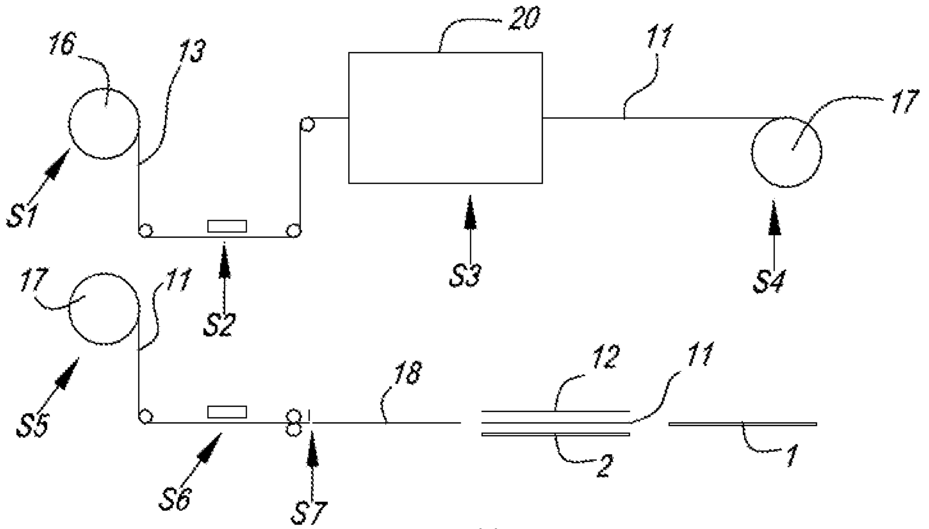
FIG. 4 shows some steps in a method for forming the panel of FIG. 1.

FIG. 4 shows some step of a method for manufacturing the panel 1. In the method is illustrated a step S1 of providing the thermoplastic foil 13 by uncoiling it from a first roll 16. The foil 13 is then provided, on at least one surface, with the inkjet receiving layer 14, for example with a doctor blade or a sprayer, in a step S2.

The coated foil 13 is then printed (step S3) in a single pass printer 20 using water-based ink. The ink comprises a binding agent having preferably a MFFT below 40° C. for example the binding agent are VC-VAC copolymer or polymer latexes, either acrylates or urethane components, dispersion or combinations thereof.

After printing, the obtained decorative foil 11 is coiled again in a second roll 17 and then stocked, as indicated in step S4.

For the production of the panel 1, the decorative foil 11 can be uncoiled from second roll 17 in a step S5 and then coated with the adhesion layer 15 in a step S6. The decorative foil 11 can then be cut into sheets 18, in a step S7. The sheets 18 are then sandwiched between a support 2 and a wear layer 12 and then thermally laminated to form the panel 1.

Figure 5:
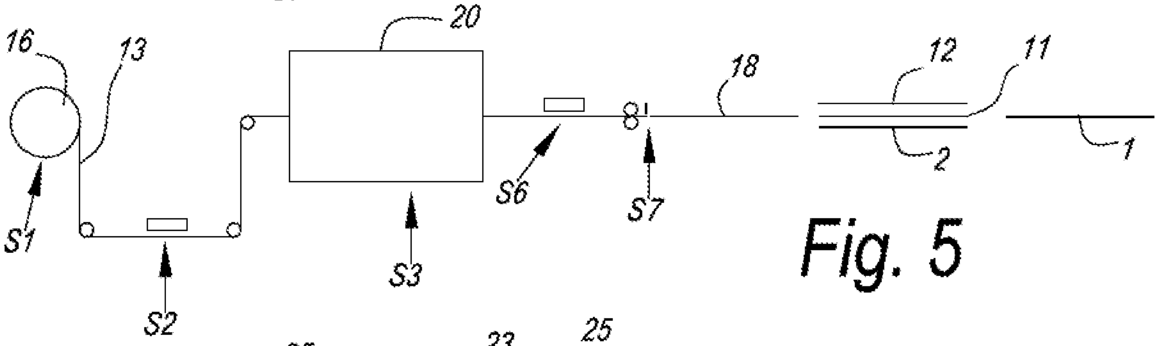
FIG. 5 shows some steps in an alternative method for forming the panel of FIG. 1.

In FIG. 5 it is shown an alternative method that differs from that of FIG. 4 in that after printing step S3 the decorative foil 11 is immediately coated with the adhesion layer 15 and then laminated onto the substrate 2. In this case, the printing line can be in line with a support manufacturing equipment, not show, for example an extruder.

Figure 6:
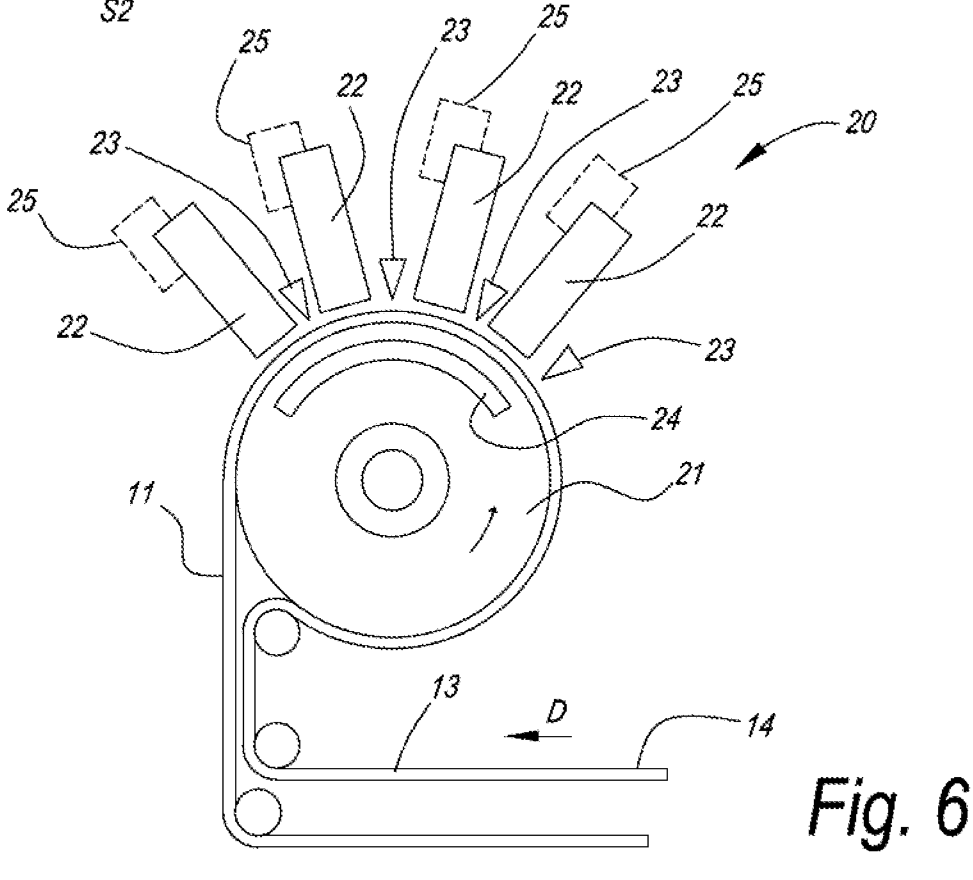
FIG. 6 schematically shows a side view of a printer operated in single-pass mode on a central cylinder.

FIG. 6 illustrates that the foil 13 having the inkjet receiver coating 14 may be printed by means of an inkjet printer 20, which, in this example comprises a central cylinder 21 upon which the foil 13 is partially wound and several printing units 22, each comprising one or more print heads, disposed radially around the central cylinder 21 and over the area of the foil 13 to be printed. The printer 20, in this example, relates to a printer of the single pass type, wherein the provision of the printed motif involves a relative motion of said inkjet printer 20, more particularly the printing unit 22, and said foil 13 during printing in a printing direction D. In this case, the printing unit 22 and the print heads are at standstill, while the foil 13 moves during ejection of inks onto the foil 13, more precisely onto the inkjet receiver coating 14 applied to the foil 13. The foil 13 gets printed during a single continuous movement of the foil 13 itself relative the printer 20.

Preferably each printing unit 22 is configured for printing only one color. Preferably each printing unit 22 extends above the entire width of the foil 13 to be printed. For example, each printing unit is composed by a so called colorbar.

In the embodiment illustrated in the example the printer 20 is provided with a plurality of NIR pins 23 each disposed after a respective printing unit 22 so that each pin 23 immediately dries the ink just printed by the respective printing unit 22. In the example the central cylinder 21 comprises a heating device 24 to heat the foil 13 during printing to further help drying of the ink. Preferably the printing operation is performed at a temperature above external environment temperature but, in any case, below 100° C. to prevent deformation of the foil.

In the example each printing unit comprises an ink recirculating circuit 25 configured to recirculate a flow of ink 10 ml/min or more.

It is generally noted that the dimensions of the represented top layer 3 and its components is, in the figures, drawn out of scale in order to better illustrate the invention.

The invention is further disclosed by the following paragraph list as defined by the below numbered items.

1. A method for manufacturing a panel of the type comprising a support and a top layer, wherein the top layer comprises a printed motif and a wear layer disposed above said motif, wherein said wear layer comprises PVC, the top layer comprising an inkjet receiving layer and said inkjet receiving layer comprising less than 10% by weight of water absorbing substances, wherein the method comprises the step of providing a printing substrate, the step of providing said printing substrate with said inkjet receiving layer, the step of digitally inkjet printing said motif with a set of water based inks, and wherein said step of digital inkjet printing comprises one or more printing operations, each of said printing operations being dedicated to print one color, characterized in that the method comprises one or more ink drying step, wherein each of said drying steps is performed after performing one or more respective printing operations.
2. The method of item 1, wherein said set of inks comprises multiple color, and wherein each ink drying step is performed after printing a correspondent ink.
3. The method of item 1, wherein the inkjet receiving layer is free from water absorbing substances.
4. The method according to any of the preceding items, wherein the inkjet receiving layer comprises a multivalent metal salt or an acid component.
5. The method according to item 4, wherein the inkjet receiving layer comprises between 30 and 80% of multivalent metal salt.
6. The method according to any of the preceding items, wherein the inkjet receiving layer comprises a water-based dispersion of terpolymer vinyl chloride, vinyl acetate ethylene, water-based dispersion of copolymer vinyl chloride, vinyl acetate or water-based aliphatic PU dispersion or a water-based acrylic dispersion or a water-based styrene acrylic dispersion or combinations thereof.
7. The method according to any of the preceding items, wherein it comprises the step of providing an adhesion layer between the printed motif and the wear layer.
8. The method according to item 7, wherein the adhesion layer comprises a water-based dispersion of terpolymer vinyl chloride, vinyl acetate ethylene, water-based dispersion of copolymer vinyl chloride, vinyl acetate or water-based aliphatic PU dispersion or water-based acrylic dispersion or a water-based styrene acrylic dispersion or combinations thereof.
9. The method according to any of the preceding items, wherein the printed motif is printed directly on the support of the panel.
10. The method according to any of the items from 1 to 8, wherein the printed motif is printed on a thermoplastic foil subsequently attached to a substrate.
11. The method according to any of the preceding items, wherein the ink comprises a binding agent.
12. The method according to item 11, wherein the said binding agent of the ink is VC-VAC copolymer or polymer latexes, either acrylates or urethane dispersion or combinations thereof.
13. The method according to item 11 or 12, wherein the said binding agent of the ink shows a MFFT below 60° C., preferably below 40° C.
14. The method according to any of the preceding items, wherein the printing step is performed at a temperature above room temperature.
15. The method according to any of the preceding items, wherein each drying step is performed via NIR pins.
16. A method for manufacturing thermoplastic foil printable with an inkjet printer for use as a decor foil, in a laminate panel, wherein the method at least comprises the following steps:
    the step of providing a thermoplastic foil;
    the step of coating at least one side of said foil, with an inkjet receiver coating; wherein said inkjet receiving coating comprises a content of water absorbing substance below 10% wt.
17. The method according to item 16, wherein said water absorbing substance comprises pigments, in particular minerals, like silicate or aluminum silicates, for example talc, clays, calcined clays, kaolin, silica.
18. The method according to item 16 or 17, wherein the inkjet receiving layer comprises a water-absorbing particle content below 5%, preferably below 1%, more preferably is free from water-absorbing particles.

19 The method according to any of the items from 16 to 18, wherein the inkjet receiver layer comprises polymeric substance, also called binder, preferably a thermosetting substance.

20. The method according to item 19, wherein the binder comprises water-based dispersion of terpolymer vinyl chloride, vinyl acetate ethylene; water-based dispersion or copolymer vinyl chloride, vinyl acetate; water-based aliphatic PU dispersion; other non-blocking water-based acrylics dispersions or a water-based styrene acrylic dispersion or combinations thereof.
21. The method according to item 19, wherein polymeric substance in said inkjet receiver coating at least or mainly polyvinyl alcohols are used.
22. The method according to item 19, wherein the polymeric substance in said inkjet receiver coating polyvinyl acetates, ethylvinylacetates, block copolymers based on polyvinylacetate, block copolymers based on polyvinylalcohol, acrylates, latexes, polyvinyl derivaties, VCVAC derivatives, polyurethanes based on polyols and isocyanates, polyurethanes based on polycarbamates and polyaldehydes, e.g. both as a waterbaseddispersion/emulsion or a waterbased or solvent solution.
23. The method according to any of the items from 19 to 22, wherein the ink receiver coating comprises a crosslinking agent for the crosslinking reaction of the polymeric substance itself.
24. The method according to any of the items from 16 to 23, wherein the inkjet receiver coating comprises a dispersant, preferably polycarboxylates, polyphosphates, a polyionic polymer, preferably polyDADMAC (Polydiallyldimethylammonium chloride) polyamine or alumina salts.
25. The method according to item 24, wherein the inkjet receiver coating is provided with less than 10%, more preferably less than 5% based on dry coating weight of dispersant, for example between 5 and 0.1%.

26. The method according to any of the items from 16 to 25, wherein the inkjet receiver coating comprises a flocculant, preferably a metal salt, preferably a cationic metal salt.
27. The method according to item 26, wherein the inkjet receiver coating is provided with 20 to 60%, based on dry coating weight of flocculating agent, in particular of metal salt.
28. The method according to any of the items from 16 to 27, wherein the inkjet receiving coating is acidic, preferably it comprises one or more organic or inorganic acid component, for example citric acid, formic acid, lactic acid, propionic acid or a combination thereof.
29. The method according to any of the items from 16 to 28, wherein the thermoplastic foil onto which the inkjet receiver coating is applied has a base weight of 50 to 100 grams per square meter, e.g. between 60 and 80 grams per square meter.
30. The method according to any of the items from 16 to 29, wherein the thermoplastic foil is as polyvinylchloride (PVC) foil, polypropylene (PP) foil, polyethylene (PE) foil, polyethylene-terephthalate (PET) foil or thermoplastic polyurethane (TPU).
31. The method according to item 19, wherein thermoplastic foil is made of PVC and the binder for use on such thermoplastic foils is polyurethane based, acrylate based, or polyvinyl acetate based.
32. The method according to any of the items from 16 to 31, wherein said inkjet receiver coating is applied in one step in order to form a unique layer having the inkjet receiving coating composition
33. The method according to any of the items from 16 to 32, wherein said inkjet receiving coating is a liquid substance which is deposited on said foil, preferably the liquid substance is a water-based suspension of at least said binder.
34. The method according to item 33, wherein the deposition of the liquid substance for the ink receiving coating is performed in a rotogravure coating line or, alternatively, on the printing equipment, immediately before the printing operation.
35. The method according to item 34, wherein in case the coating is wholly or partially done on a printing equipment for printing a pattern, the printing equipment is preferably roll-to-roll or a roll-to-sheet printer, comprising a coating device upstream of the print heads, for example a gravure coater and/or additional printing heads suitable for printing the liquid substance for the respective sublayer of the inkjet receiver coating.
36. The method according to item 35, wherein said additional printing heads, for example an additional row of printing heads, may have nozzles with a larger diameter than those used for the actual printing of the pattern, preferably resolution of 1 to 100, or even 1 to 25 dots per inch may suffice for these nozzles.
37. A thermoplastic foil for inkjet printing, wherein said foil at least at one side is provided with an inkjet receiver coating having an absorbing substance content below 10% wt, preferably said inkjet receiver coating is free from any water absorbing substance.
38. A method for manufacturing a panel of the type comprising a support and a top layer, wherein the top layer comprises a printed motif, wherein said printed motif is provided on a printable substrate having an inkjet receiver coating having an absorbing substance content below 10% wt, preferably said printable substrate is a thermoplastic foil according to item 37 or obtained in a method according to any of the items from 16 to 36, wherein the motif is printed by means of an inkjet printer, preferably using water-based inks or hydro-UV inks.
39. The method according to item 38, wherein the foil is attached to said substrate material by means of a hot-pressing treatment, for example thermal lamination.
40. The method according to item 38 or 39, wherein said ink comprises a binder, preferably said binder comprises VC-VAC copolymer or polymer latexes, either acrylates or urethane components dispersion or combinations thereof and/or preferably said binder shows a MFFT below 60° C., more preferably below 50° C., for example 40° C. or less.
41. The method according to any of the items from 38 to 40, wherein the step of printing is performed at a temperature above external environment temperature, for example below 100° C., preferably below 60° C.
42. The method according to any of the items from 38 to 41, wherein after printing the ink is dried to remove water or vehicle residues, preferably multiple drying steps to dry one or more inks are performed, for example, in case of printing a set of inks, preferably a set of colored inks, drying step dedicated do each color is performed.
43. The method according to item 42, wherein after each printing head or printing unit a drying unit is provided, for example a drying NIR (Near Infra-Red) pin, to perform one drying step between the printing units.
44. The method according to any of the items from 41 to 43, wherein during printing, the foil is placed on a heated support, for example a heated printing drum.
45. The method according to any of the items from 38 to 44, wherein the top layer comprises a wear layer disposed above said motif, wherein said wear layer preferably comprises PVC.
46. The method according to any of the items from 38 to 45, wherein the top layer is provided with a first adhesion layer between the motif and the top layer and/or a second a adhesion layer between the foil and the substrate.
47. The method according to the item 46, wherein the first and/or second adhesion layer comprises, or is formed by, the same substance forming the binder of the ink receiving layer.
48. The method according to the item 46 or 47, wherein the first and/or second adhesion layer comprises a water-based dispersion of terpolymer vinyl chloride, vinyl acetate ethylene; water-based dispersion or copolymer vinyl chloride, vinyl acetate; water-based aliphatic PU dispersion; other non-blocking water-based acrylics dispersions or a water-based styrene acrylic dispersion or combinations thereof.
49. The method according to any of the items from 45 to 48, wherein the wear layer is applied above the printed motif after printing, e.g. by way of a plastic thermoplastic foil or a liquid coating, preferably while the printed foil is laying on the substrate, either loosely or already connected or adhered thereto.
50. The method according to any of the items from 38 to 49, wherein the method comprises a step of embossing the upper surface of the panel, for example by embossing the wear layer and/or the printed foil, preferably the embossing step is performed before, after or during thermal lamination of the thermoplastic foils on the substrate or alternatively it is possible that the wear layer is provided with an embossed structure.

51. The method according to any of the items from 38 to 50, wherein the printing operation is performed directly on the support, for example wherein the printable substrate is the support or wherein a blank printable foil is attached on the support before printing.

52. The method according to any of the items from 38 to 51, wherein the printable substrate is made of a thermoplastic material.

53. The method and or the foil according to any of the preceding items, wherein the foil of the invention may be a colored, pigmented and/or dyed base foil 54. The method and or the foil according to any of the preceding item, wherein the ink receiving layer is colored or pigmented with colored pigments.

The present invention is in no way limited to the above described embodiments, but such methods, thermoplastic foils and panel may be realized according to several variants without leaving the scope of the invention.

The invention claimed is:

1. A method for manufacturing a panel having a support and a top layer, the top layer having a printed motif and a wear layer disposed above the printed motif, the wear layer including polyvinylchloride (PVC), the top layer having an inkjet receiving layer that includes less than 10% by weight of water absorbing substances, the method comprising:

providing a printing substrate;

providing the printing substrate with the inkjet receiving layer;

digital inkjet printing the motif with a set of water-based inks;

wherein the digital inkjet printing includes one or more printing operations, each of the printing operations being dedicated to print one color;

one or more ink drying steps, wherein each of the ink drying steps is performed after performing one or more respective printing operations;

wherein the water-based ink comprises a binding agent;

wherein the binding agent of the water-based ink is vinyl chloride-vinyl acetate copolymer or polymer latexes, ether acrylates or urethane dispersion or combinations thereof; and wherein the binding agent of the water-based ink shows a minimum film forming temperature (MFFT) below 60° C.

2. The method of claim 1, wherein the set of water-based inks comprises multiple colors; and wherein each ink drying step is performed after printing a correspondent ink.

3. The method of claim 1, wherein the inkjet receiving layer is free from water absorbing substances.

4. The method according to claim 1, wherein the inkjet receiving layer comprises a multivalent metal salt or an acid component.

5. The method according to claim 4, wherein the inkjet receiving layer comprises between 30 and 80% of multivalent metal salt.

6. The method according to claim 1, wherein the inkjet receiving layer comprises a water-based dispersion of terpolymer with vinyl chloride, vinyl acetate, and ethylene, a water-based dispersion of copolymer with vinyl chloride and vinyl acetate, a water-based aliphatic polyurethane (PU) dispersion, a water-based acrylic dispersion, a water-based styrene acrylic dispersion, or combinations thereof.

7. The method according to claim 1, comprising providing an adhesion layer between the printed motif and the wear layer.

8. The method according to claim 7, wherein the adhesion layer comprises a water-based dispersion of terpolymer with vinyl chloride, vinyl acetate, and ethylene, a water-based dispersion of copolymer with vinyl chloride and vinyl acetate, a water-based aliphatic polyurethane (PU) dispersion, a water-based acrylic dispersion, a water-based styrene acrylic dispersion, or combinations thereof.

9. The method according to claim 1, wherein the printed motif is printed directly on the support of the panel.

10. The method according to claim 1, wherein the printed motif is printed on a thermoplastic foil that is subsequently attached to the support.

11. The method according to claim 1, wherein the digital inkjet printing is performed at a temperature above room temperature.

12. The method according to claim 1, wherein each of the ink drying steps is performed via near infra-red (NIR) pins.

13. A method for manufacturing a thermoplastic foil printable with an inkjet printer for use as a decor foil in a laminate panel, the method comprising:

providing a thermoplastic foil;

coating at least one side of the thermoplastic foil with an inkjet receiving layer;

wherein the inkjet receiving layer has a content of water absorbing substance below 10% wt;

digital inkjet printing a motif with a set of water-based inks;

wherein the water-based ink comprises a binding agent;

wherein the binding agent of the water-based ink is vinyl chloride-vinyl acetate copolymer or polymer latexes, ether acrylates or urethane dispersion or combinations thereof; and wherein the binding agent of the water-based ink shows a minimum film forming temperature (MFFT) below 60° C.

14. The method according to claim 13, wherein the water absorbing substance comprises pigments.

15. The method according to claim 14, wherein the inkjet receiving layer comprises a water-absorbing particle content below 5% wt.

16. The method according to claim 13, wherein the inkjet receiving layer comprises polymeric binder.

17. The method according to claim 16, wherein the polymeric binder comprises a water-based dispersion of terpolymer with vinyl chloride, vinyl acetate, and ethylene, water-based dispersion of copolymer with vinyl chloride, and vinyl acetate, a water-based aliphatic polyurethane (PU) dispersion, a non-blocking water-based acrylic dispersions, a water-based styrene acrylic dispersion, or combinations thereof.

* * * * *